United States Patent [19]

Yokota et al.

[11] 4,449,151

[45] May 15, 1984

[54] SOLID-STATE SCANNING APPARATUS

[75] Inventors: Takashi Yokota, Tokyo; Shigeru Yamazaki, Tanashi; Yoshiaki Kanmoto, Tokyo; Motoaki Kawazu, Kawasaki; Noboru Murayama, Machida; Daisuke Abe, Misato, all of Japan

[73] Assignee: Ricoh Company, Ltd., Japan

[21] Appl. No.: 452,433

[22] Filed: Dec. 23, 1982

Related U.S. Application Data

[63] Continuation-in-part of Ser. No. 270,119, Jun. 3, 1981, abandoned.

[51] Int. Cl.³ .............................................. H04N 1/02
[52] U.S. Cl. ................................... 358/293; 358/213; 358/294
[58] Field of Search ............... 358/293, 213, 258, 256, 358/294; 250/208, 209; 280/578

[56] References Cited

U.S. PATENT DOCUMENTS

| | | | |
|---|---|---|---|
| 4,081,843 | 3/1978 | Okano | 358/294 |
| 4,146,786 | 3/1979 | Agulnek | 358/213 |
| 4,356,513 | 10/1982 | Yoshimura et al. | 358/293 |
| 4,358,794 | 11/1982 | Kurakami et al. | 358/293 |

Primary Examiner—John C. Martin
Assistant Examiner—Edward L. Coles
Attorney, Agent, or Firm—Guy W. Shoup; Gerard F. Dunne

[57] ABSTRACT

A solid-state scanning apparatus for scanning the surface of an original to convert light information into electrical signals suitable for application to a facsimile system is provided. The scanning apparatus comprises a stationary original holder, on which an original to be scanned is placed, a stationary optical system including a solid-state line sensor comprised of at least two CCD image sensing devices arranged in a line to carry out the split scanning with a predetermined overlapping scanning section between the two adjacent scanning sections, a pair of first and second storing devices provided for each of said CCD image sensing devices, a control circuit for controlling the operation of the CCD image sensing devices and the storing devices, and a reciprocatingly movable mirror system for leading the light information of the original to the solid-state line sensor.

13 Claims, 14 Drawing Figures

(a) ADDRESS (b) CARRY (c) LOAD (d) ADDRESS (for switch 95 = "0")

(e) ADDRESS (for switch 95 = "15")

SOLID-STATE SCANNING APPARATUS

CROSS-REFERENCE TO RELATED APPLICATION

This is a continuation-in-part of copending Patent application Ser. No. 06/270,119 filed June 3, 1981 entitled "SOLID-STATE SCANNING APPARATUS" now abandoned.

BACKGROUND OF THE INVENTION

1. Field of the Invention

This invention relates to a solid-state scanning apparatus for reading a stationary original. And, more in particular, the present invention relates to a solid-state scanning apparatus which employs a solid-state image sensor comprised of CCD image sensing elements for converting light information into electrical signals by carrying out the raster type scanning.

2. Description of the Prior Art

For a communication system such as a facsimile and a digital copier, it is necessary to read an original to convert light information into electrical signals for transmission by wire or radio to a remote place where the original image is reproduced. In reading an original, it is common practice to use a line sensor which scans the horizontal sector of the original and to move either of the original or the line sensor with respect to the other in the direction vertical to the direction of the horizontal sector scan. This type of scanning is sometimes referred to as the "raster scanning."

When the line sensor is provided stationarily, an original must be moved with respect to the line sensor, which then requires to provide a movable original holder having a contact glass on which the original is placed. But, this approach is disadvantageous because it hinders a high speed operation partly due to a substantive mass of the original holder and partly due to involvement of a reciprocating motion of the original holder, the returning movement of which is nothing but waste of time. It is true that a special feeder may be provided for sheet-type originals in order to speed up the feeding operation. But, this does not solve the problems for thicker or book-type originals. Moreover, it is often observed that a sheet-type original is jammed in such a special feeder, thereby causing possible damages to the original.

Therefore, it is rather preferable to use a stationary contact glass on which an original is to be placed since various kinds of originals may be equally applicable without problems. If an original is kept stationary, then the line sensor must be moved to carry out the raster type scanning. The conventional scanning apparatus of this type, a typical example of which is disclosed in the Japanese Patent application Laid-Open No. 50-125614, was comprised of an illumination lamp, a lens, a mirror system and a CCD line sensor, all assembled as a unit. Such scanning apparatus was moved along the contact glass to carry out the raster type scanning, thereby reading the original held on the stationary contact glass.

It should, however, be noted that the above-described conventional solid-state scanning apparatus was relatively large and heavy, thereby imposing severe limitations on a high speed operation and presenting difficulties in moving the apparatus uniformly in speed as well as requiring a large driving force. Furthermore, when the above-described conventional apparatus is operated, the apparatus receives accelerating and decelerating forces as well as shocks at the end of the forward or backward stroke of movement. This can be a cause of shifting the setting position of various components of the apparatus, importantly the lens and the CCD line sensor. As may be easily understood, such shifting of the lens and/or the CCD line sensor is highly critical because the positional accuracy of the light-receiving surface of the CCD line sensor is approximately proportional to the inverse of the image reduction rate.

As is well known, there is a maximum size limitation in making a silicon wafer from which CCD's are manufactured. Thus, when a horizontal sector of an original to be scanned by a CCD line sensor is relatively large (e.g., a very wide original) or it is desired to increase the resolving power by having high-density picture elements, the horizontal scanning sector should be split into two or more sections with the provision of CCD image sensing devices arranged in a single line extending in the direction of horizontal scanning. If such a plurality of CCD devices are provided, the relative positional relationship among the CCD devices is vitally important for proper scanning.

It will be easily understood that such a split scanning cannot be easily employed in the conventional stationary-original-type scanning apparatus because shocks or vibrations imparted will destroy the proper setting of the lenses and/or CCD devices. In other words, the conventional scanning apparatus with a stationary original cannot be used for large-sized originals or high-resolving power applications.

SUMMARY OF THE INVENTION

The disadvantages of the prior art are obviated with the present invention and an improved solid-state scanning apparatus, which is capable of carrying out a high speed scanning operation and which is suitable to incorporate the split scanning concept, is provided.

The advantages of the present invention are preferably attained by providing an original holder, a solid-state image sensor, preferably CCD sensor, and a lens system, all stationary with respect to each other, and by providing a mirror system movable with respect to the original holder for leading the light information from an original on the original holder to the solid-state image sensor through the lens system. Preferably, a guide rod is provided along the original holder in the lengthwise direction which is vertical to the horizontal scanning direction of the solid-state image sensor, and the mirror system is driven to move along the guide rod thereby enabling to carry out the raster type scanning. The mirror system is preferably comprised of a pair of mirrors each of which is mounted on a separate carriage. These carriages are preferably driven to move with one carriage moving twice as fast as the other.

Since the solid-state image sensor is stationarily provided in the present invention, the split scanning concept may be easily applied to the present invention, in which the solid-state image sensor is comprised of two or more solid-state image sensing devices arranged in a single line. In this instance, it is preferable to provide a lens for each of the image sensing devices.

It is also preferable to provide a feed back control of the driving source which drives the movement of the mirror system in order to assure a smooth scanning operation.

Therefore, it is an object of the present invention to provide an improved solid-state scanning apparatus which is capable of carrying out a scanning operation at a high speed with increased smoothness.

Another object of the present invention is to provide a solid-state scanning apparatus to which the split scanning concept may be easily applied, thereby enabling to scan a large-sized original or increasing the resolving power.

A further object of the present invention is to provide a solid-state scanning apparatus which is simple in structure and thus easy to manufacture.

A still further object of the present invention is to provide a solid-state scanning apparatus which requires only a minimum amount of power for operating the present apparatus by making the moving components as small in number and light as possible.

Other objects, advantages and novel features of the present invention will become apparent from the following detailed description of the invention when considered in conjunction with the accompanying drawings.

DESCRIPTION OF THE PREFERRED EMBODIMENTS

Figure 1:
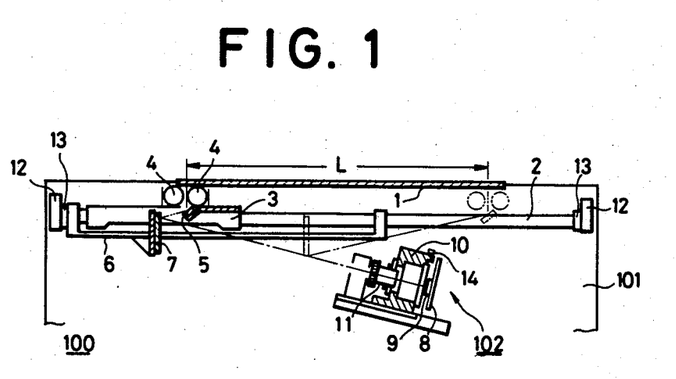
FIG. 1 is a schematic illustration partly in cross-section of a solid-state scanning apparatus embodying the present invention.
Figure 2:
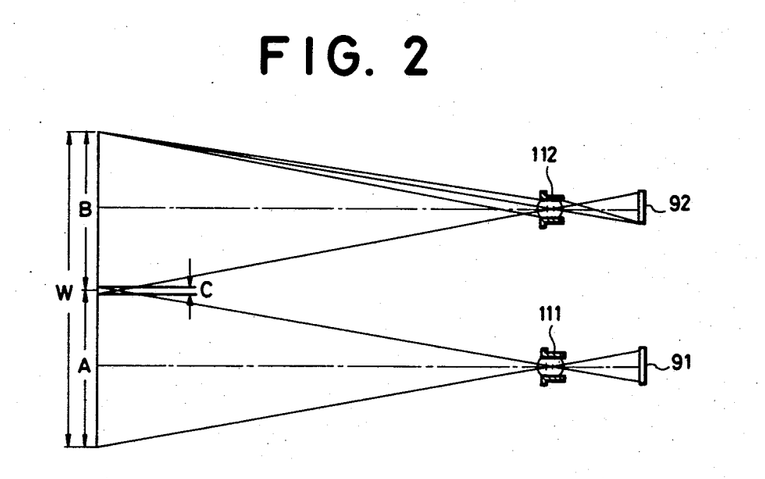
FIG. 2 shows one example of the optical system of the present apparatus when the split scanning concept is applied.

Referring now to FIG. 1, there is shown a solid-state scanning apparatus 100 which comprises a transparent contact glass 1 on which an original to be read may be placed. The contact glass 1 has a lengthwise expanse L and a width W in the horizontal scanning direction as shown in FIG. 2. The contact glass 1 is fixedly mounted on a housing 101. A guide rod 2 is disposed below the contact glass 1 and fixedly mounted on the housing 101 extending in the lengthwise direction of the contact glass 1. Each end of the guide rod 2 is provided with a stopper 12 and a cushion member 13.

Slidably mounted on the guide rod 2 is a first carriage 3 which carries thereon a pair of illumination lamps and a first reflecting mirror 5 as a unit, and which is driven to move at a constant velocity. A second carriage 6 is also slidably mounted on the guide rod 2 and a second reflecting mirror 7 is fixedly mounted on the second carriage 6. The carriage 6 together with the mirror 7 is driven to move in synchronism with the first carriage, preferably at a half of the velocity of the first carriage 3.

An optical system 102 is fixedly mounted on the housing 101 and the optical system 102 is comprised of a base plate 8 on which is mounted a CCD line sensor 9 and a lens holder 10 adjustably holds a lens 11. It is to be noted that the line sensor 9 may be comprised of a plurality of CCD image sensing devices arranged in a line as will be described later in connection with FIG. 2. A knob 14 is provided for adjusting the relative positional relationship between adjacent CCD image sensing devices if two or more of them are provided.

Referring to FIG. 2, which shows unfolded optical paths, there is provided a pair of CCD image sensing devices 91 and 92 arranged in a line as one example of the CCD image sensor 9 in accordance with the split scanning concept. In front of the devices 91 and 92 are disposed lenses 111 and 112, respectively. A set of the CCD image sensing device 91 and the lens 111 scans the one half width A and the other set of the device 92 and the lens 112 scans the other half width B with an overlapping section C inbetween. As may be understood, the split scanning concept allows to scan a wider distance, or alternatively, use of two or more CCD devices for the same width scanned by a single CCD device increases the number of picture elements per unit distance thereby increasing the resolving power.

Figure 3:
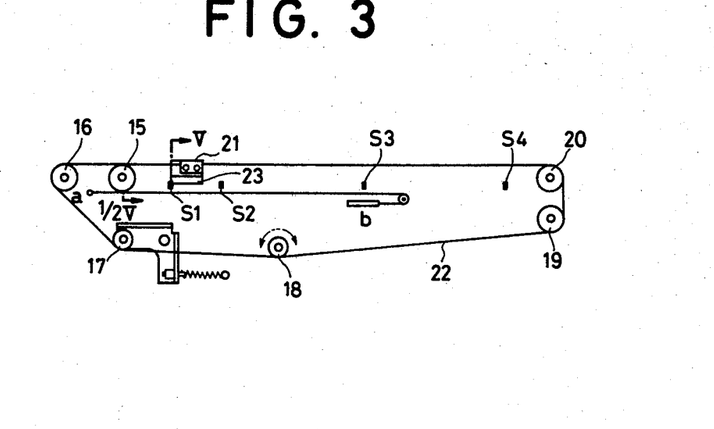
FIG. 3 shows one example of the driving mechanism of the present apparatus.

With reference to FIG. 3, there is shown one example of the driving chain mechanism for driving to move the first and the second carriages 3 and 6. As shown, one end of a steel wire 22 is connected to a fixed point a on the housing 101, and the wire 22 goes around a pulley 15 which is rotatably held by the second carriage 6. The wire 22 further goes around a guide pulley 16 and a tension pulley 17, and it is in engagement with a driving drum 18. Then, the wire 22 extends around guide pulleys 19 and 20, and it is connected to a fixed point b on the housing 101 after going around the pulley 15. A bracket 21 forming a part of the first carriage 3 is fixed to the wire 22.

The drum 18 is driven by a motor to rotate in one direction or the reverse direction and it is accelerated, decelerated or stopped appropriately. The wire 22 is driven to travel through engagement with the drum 18 and, therefore, the first and the second carriages 3 and 6 driven to move through the bracket 21 and the pulley 15, respectively. It will be easily understood that, in the arrangement shown in FIG. 3, the bracket 21 moves twice as fast as the pulley 15 in the direction shown by the arrows when the wire 22 is driven to travel. Thus, when the first carriage 3 and the mirror 5 move with a velocity V, the second carriage 6 and the mirror 7 move with a velocity V/2.

Also shown in FIG. 3 are an initial position sensor S1, a start/brake sensor S2, DIN A4 size end sensor S3 and DIN A3 size end sensor S4. A feeler 23 is provided on the bracket 21 and the feeler 23 is engageable with each of the sensors S1 through S4 to detect the current position of the first carriage 3. When detected, a signal is generated and fed to a control circuit as shown in FIG. 4 to control the driving condition of the motor for the drum 18.

Figure 4:
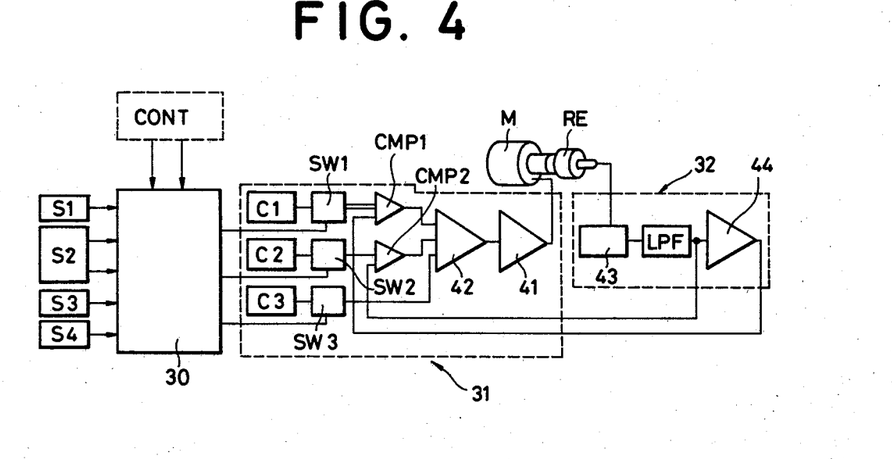
FIG. 4 is a block diagram showing one example of the control circuit for controlling the driving motor of the driving mechanism shown in FIG. 3.

As shown in FIG. 4, a control circuit for the motor M generally comprises a scanning control unit 30, a velocity switching unit 31 and a constant velocity control unit 32. Output signals from the position sensors S1–S4 and output signals, such as initiation signals and original size indication signals, are fed from a system control CONT, which controls the whole system of image processing, to the unit 30 which supplies control signals such as start, normal rotation, reversed rotation, deceleration and stop signals in response to the signals fed.

The velocity switching unit 31 includes velocity setting circuits C1–C3 which supply velocity signals indicating the velocity of the carriages 3 and 6 in the lengthwise direction to a motor driving amplifier 41 through switching circuits SW1–SW3. Any conventional circuit may be employed for the velocity setting circuits C1–C3 and the switching circuits SW1–SW3, so details of these circuits will not be described here. Outputs from the scanning control unit 30 are fed to the switching circuits to pass velocity signals from the velocity setting circuits when activated. The output terminal of the circuit SW1 is connected to one input terminal of a comparator CMP1. Likewise, the output terminal of the circuit SW2 is connected to one input terminal of a comparator CMP2. The output terminals of these comparators CMP1 and CMP2 are connected to respective input terminals of a buffer amplifier 42. The remaining input terminal of the amplifier 42 is connected from the output terminal of the circuit SW3. The output terminal of the buffer amplifier 42 is connected to the input terminal of the other amplifier 41, the output signals of which are supplied to the motor M to control its drivement.

A rotary encoder RE is provided to detect the rotating conditions of the motor M. Detected signals from the rotary encoder RE are fed to a low pass filter LPF through a F/V converter 43. The output terminal of the low pass filter LPF is connected to the remaining input terminal of the comparator CMP2, and it is also connected to the input terminal of a polarity inverting amplifier 44 the output terminal of which is connected to the remaining input terminal of the comparator CMP1. The output from the switching circuit SW1 supplies a reference or set velocity signal in the mode of normal rotation to the comparator CMP1 which also receives actual velocity signals from the constant velocity control unit 32 as feed-back signals. The switching circuit SW2 supplies a reference velocity signal in the mode of reversed rotation to the comparator CMP2 which also receives feed-back signals from the control unit 32.

As described above, in accordance with the present invention, the split scanning concept may be advantageously applied since the optical system including the CCD line sensor 9 and the lens 11 is held stationary and only the mirror system is moved to traverse the lengthwise direction. The structure of the present invention allows to keep the relative positional relationship between the CCD image sensing devices and their respective lenses unchanged. For example, if two CCD image sensing devices 91 and 92, each having 1728 bits or picture elements, are provided to form the CCD line sensor 9, for the horizontal scan sector length W of 297 mm, the resolving power becomes 11.5 picture elements/mm. This indicates that the present invention allows to scan the whole surface of a DIN A3 size original with a high resolving power just by moving two mirrors 5 and 7 in synchronism.

The structure of the present invention also allows to make the moving components, i.e., carriages 3 and 6, light in weight, which, in turn, enables to carry out a high speed operation with improved accuracies. It should also be noted that a part of the optical path remains unchanged during the entire scanning operation, which also contributes to make the whole system compact in size and to give an increased freedom in design.

It should also be understood that the feed-back control of the motor M insures that the mirrors 5 and 7 are moved at constant speeds during scanning, and irregularities in speed are eliminated. Thus, no vibrations are imparted to the mirrors 5 and 7 during operation, which also contributes to maintain a high resolving power.

It is to be further noted that CCD image sensing devices may be provided more than two to form a CCD line sensor 9 when applying the split scanning concept to the present invention. The driving mechanism for the carriages 3 and 6 may be structured by any conventional art other than the combination of the guide rod 2 and the wire 22. Besides, a DC linear motor may be used as the driving motor M and, if so, the carriages 3 and 6 may be directly driven by the DC linear motor without providing driving force transmission means, which helps contribute to simplify the driving mechanism. In this connection, a linear encoder may preferably be used. It goes without saying that various sensors such as optical or electro-magnetic sensors may be employed as position detectors other than mechanical sensors such as a feeler provided in the above embodiments of the present invention.

In accordance with one mode of the operation of the present apparatus, in response to a start signal from the system control CONT, the first mirror 5 and the second mirror 7 start to move with the velocity ratio of 2 to 1. On the other hand, in association with position signals from the position sensors S1–S4, photo-electric signals are produced by the CCD line sensor 9. These photo-electric signals are passed through an A/D converter to generate a sequence of signals which are supplied to an external device for further processing. This mode of operation is often referred to as the "dual sense mode" operation.

Now, a description will be made with respect to the split scanning system which may be advantageously applied to the above-described structure. The split scanning system, which will be described in detail below, is characterized by having an overlapping portion of a predetermined length between the two adjacent scanning sections which are the segments of a full single scanning line. That is, with refrence to FIG. 5, an original document placed on the contact glass 1 is scanned by the pair of CCD image sensors 91 and 92 with the overlapping portion C of a predetermined length. The information of the overlapping portion C is unconditionally eliminated from one of the image signals obtained by the CCD image sensors 91 and 92 when they are combined to supply a video output signal.

Figure 5:
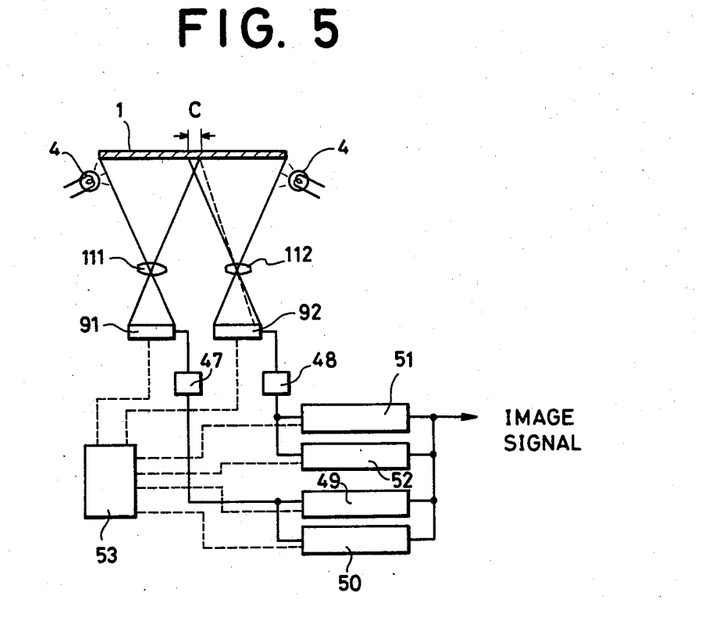
FIG. 5 is a schematic illustration showing one example of the split scanning system to be applied to the scanning apparatus of the present invention.

As shown in FIG. 5, an original document (not shown) placed on the contact glass 1 is illuminated by the lamps 4, 4 and the reflected light from the left half scanning section is focused on the CCD 91 through the lens 111; on the other hand, the reflected light from the right half scanning section is focused on the CCD 92 through the lens 112, and the overlapping scanning section C common to both of the right and left scanning sections exists in the middle. The CCDs 91 and 92, each having the capacity of 1,024 bits, convert the respective light information received into electrical signals which are then supplied to analog-to-digital (A/D) converters 47 and 48, respectively. The A/D converter 47 is connected to supply its output of digitized information to either one of memory devices 49 and 50. Similarly, the A/D converter 48 is connected to supply its output of digitized information to either one of memory devices 51 and 52.

It is to be noted that the memory devices 49 through 52 are so controlled that when either one of the paired memory devices is set in the read-out mode, the other memory device is set in the write-in mode. That is, when the memory device 49 is set in the write-in mode, the memory device 50 is set in the read-out mode; whereas, when the memory device 49 is set in the read-out mode, the memory device 50 is set in the write-in mode. The other paired memory devices 51 and 52 are similarly controlled. Thus, when the memory device 49 receives signals from the A/D converter 47, the other memory device 50 supplies the information stored therein as its output.

Figure 6:
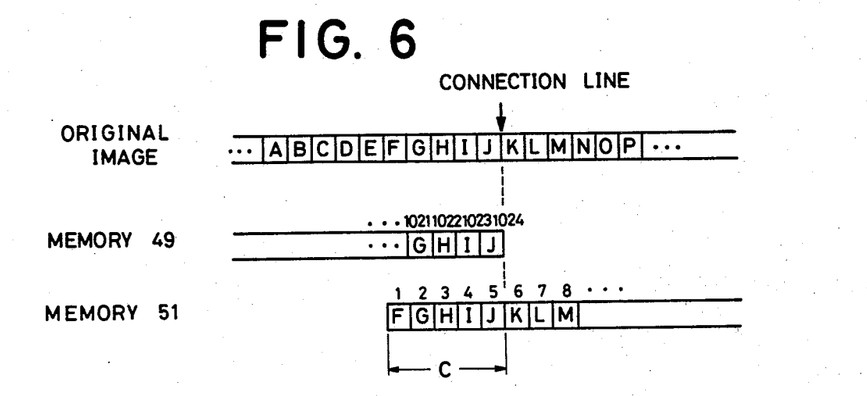
FIG. 6 is a schematic illustration useful for explaining how information as to picture elements along a single scanning line is stored in the respective memory devices 49 and 51 when the pair of CCDs 91 and 92 are driven simultaneously.

If the CCDs 91 and 92 are driven simultaneously to supply the scanned information to the memory devices 49 and 51, respectively, each of the memory devices 49 and 51 will come to contain the overlapping information. For example, as shown in FIG. 6, in the case of scanning a single line of the original image having picture elements "A", "B", . . . , etc. by simultaneously driving the CCDs 91 and 92, each of the memory devices 49 and 51 will store five bits of the common information "F" through "J" corresponding to the overlapping portion C between the two split scanning sections.

Figure 7:
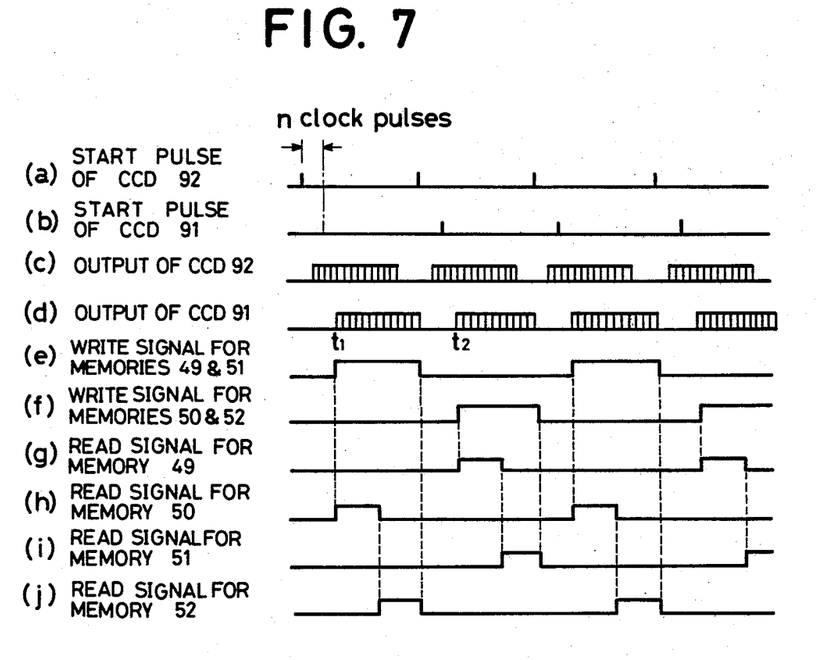
FIG. 7 is a timing diagram useful for explaining the operation of the split scanning system of FIG. 5.

In accordance with the present invention, the CCDs 91 and 92 are not driven at the same time. As best shown in FIG. 7, the CCD 92 is first driven to operate and then after elapsing a predetermined time period corresponding to the number n (five in the illustrated embodiment) of clock pulses for scanning the overlapping section C the other CCD 91 is driven to operate. Thus, at time $t_1$ when driving of the CCD 91 is initiated, the information starts to be read into the memory devices 49 and 51 from the CCDs 91 and 92, respectively. While the memory devices 49 and 51 are in the write-in mode, the information is read out of the memory devices 50 and 52 in timed sequence. Since the write operation into the memory devcies 49 and 51 of image information sensed by the CCDs 91 and 92 is controlled as described above, the memory device 51 receives the image information which does not include the image information of the overlapping portion C. A control circuit 53 is provided as connected to the CCDs 91 and 92 and the memories 49 through 52 to implement the above functions. The control circuit 53 may be comprised of any well-known devices such as a central processing unit.

Stated more in detail, as shown in FIG. 7, the production of a start pulse for the CCD 91 is delayed by n clock pulses (5 clock pulses in the illustrated embodiment) as compared with the production of a start pulse for the CCD 92. The n clock pulses indicate the number of bits corresponding to the length to the overlapping portion C. Thus, the CCD 92 starts to supply its output 5 clock pulses or 5 bits ahead of the CCD 91. However, address counters of the memories 49 and 51 start their counting operations in association with the start pulse for the CCD 91, and, therefore, the write-in operation for the memories 49 and 51 is initiated at the same time in response to the start pulse for the CCD 91. With the above-described operation, the five bits of image information which are produced in advance are prevented from entering into the memory 51, and the image information of the overlapping poriton C is only taken into the memory 49 through the CCD 91. In this manner, the paired memories 49 and 51 or 50 and 52 store the data of a full single scanning line without storing the overlapping portion C in repetition. When the data stored in the paired memories 49 and 51 or 50 and 52 are to be read out, the paired memories 49(50) and 51(52) are selected in sequence and their address counters are set in counting operation one after another to supply the image information of a full single scanning line continuously.

In the next cycle of scanning operation, the CCDs 91 and 92 are set in operation one after another with a predetermined time lag corresponding to n clock pulses therebetween in the same manner as described above. At time $t_2$, while the output from each of the CCDs 91 and 92 is stored into the corresponding memory 50 or 52, the image data stored in the memories 49 and 51 are read out in timed sequence as shown in FIG. 7 so that the image information for a full single line with the overlapping portion C properly processed may be obtained.

Figure 8:
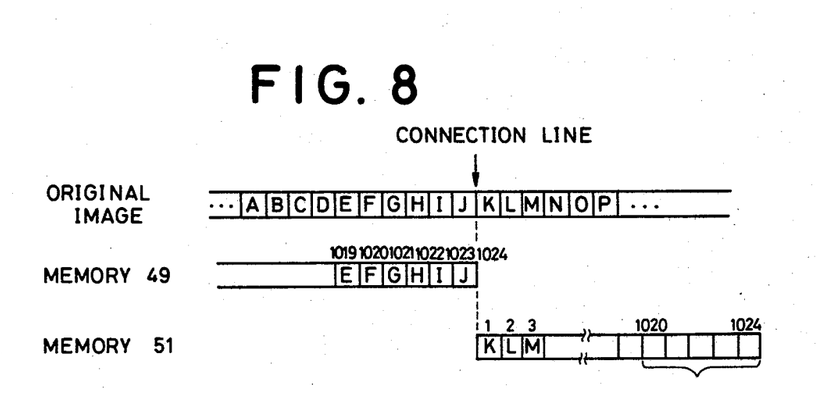
FIG. 8 is a schematic illustration useful for explaining how information as to picture elements along a single scanning line is stored in the respective memory devices 49 and 51 when the split scanning system of FIG. 5 is operated in accordance with the present invention.

Because of the above-described manner of operation, the memories 49 and 51 will store image information at each address as shown in FIG. 8. That is, the memory 49 will store 1,024 bits of image information, i.e., one pixel for one address; on the other hand, the memory 51 will store 1,019 bits of information in the address locations of 1 from 1,019 and the remaining address locations of 1,020 through 1,024 will store invalid data. However, as is well known in the art, the readout operation is so controlled not to supply these invalid data as an output.

Figure 9:
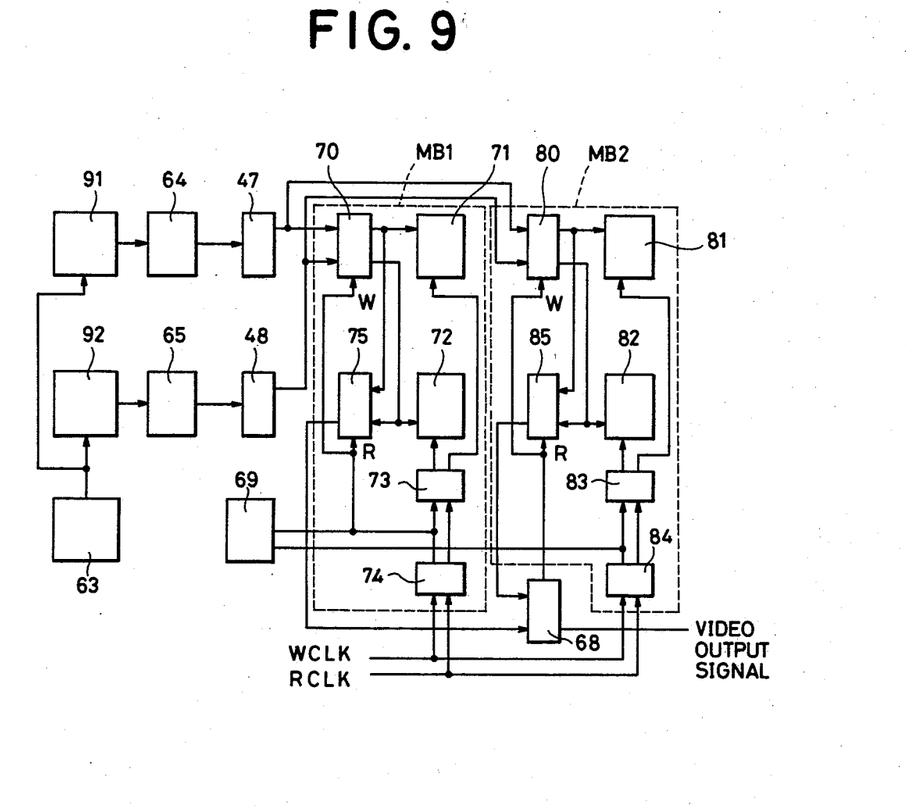
FIG. 9 is a block diagram showing another example of the split scanning system to be applied to the scanning apparatus of the present invention.

Now, another embodiment of the present invention for processing the image information of the overlapping portion C in a split scanning system will be described with reference to FIG. 9. As shown in FIG. 9, there is provided a driving circuit 63 for driving the CCDs 91 and 92, each having the capacity of 1,024 bits, simultaneously in parallel. The CCD 91 is connected to supply its output to the A/D converter 47 through an amplifier 64 and similarly the CCD 92 is connected to supply its output to the A/D converter 48 through an amplifier 65. Also provided is a pair of memory blocks MB1 and MB2 each of which temporarily stores the image information of an approximately half of a single scanning line and of the overlapping portion C when supplied from the A/D converters 47 and 48. A line switching circuit 68 is provided as connected to the memory blocks MB1 and MB2 and it functions to carry out switching of the outputs alternately supplied from the memory blocks MB1 and MB2 to form a video output signal containing the image information for a single scanning line. Also provided is a mode/line switching signal generating circuit 69 as connected to the line switching circuit 68 as well as to the memory blocks MB1 and MB2. The circuit 69 controls the mode of operation, write-in mode or read-out mode, of each of the memory blocks MB1 and MB2 and moreover it controls the operation of the line switching circuit 68.

The memory block MB1 includes an input gate 70 which is made open in response to a write-in mode signal W generated by the mode/line switching signal generating circuit 69 thereby allowing the output from the A/D converter 47 to be stored into a first memory 71 and the output from the A/D converter 48 to be stored into a second memory 72 at the same time in parallel. The memory block MB1 also includes a clock gate 74 which is made open in response to a write-in mode signal W or read-out mode signal R generated from the circuit 69 thereby allowing an externally supplied write-in clock signal WCLK or read-out clock signal RCLK to be supplied to an address register 73 which then controls the addressing of each of the first and second memories 71 and 72. Also provided in the memory block MB1 is an output gate 75 which is made open in response to the read-out mode signal R generated from the circuit 69 thereby transmitting the video signal of a single scanning line which is read out of the first and second memories 71 and 72 in sequence to the line switching circuit 68.

The other memory block MB2 is similarly structured and it includes an input gate 80, a third memory 81, a fourth memory 82, an address register 83, a clock gate 84 and an output gate 85.

While each of the memory blocks MB1 and MB2 is in the write-in mode, each of the address counters 73 and 83 counts the write-in clock pulses WCLK; on the other hand, while each of the memory blocks MB1 and MB2 is in the read-out mode, each of the address counters 73 and 83 counts the read-out clock pulses RCLK. Preferably, it is so structured that the read-out clock signal RCLK has a higher frequency than the write-in clock signal WCLK, most preferably twice or more.

Now, the operation of the split scanning control system shown in FIG. 9 will be described with reference to the timing chart shown in FIG. 10.

Figure 10:
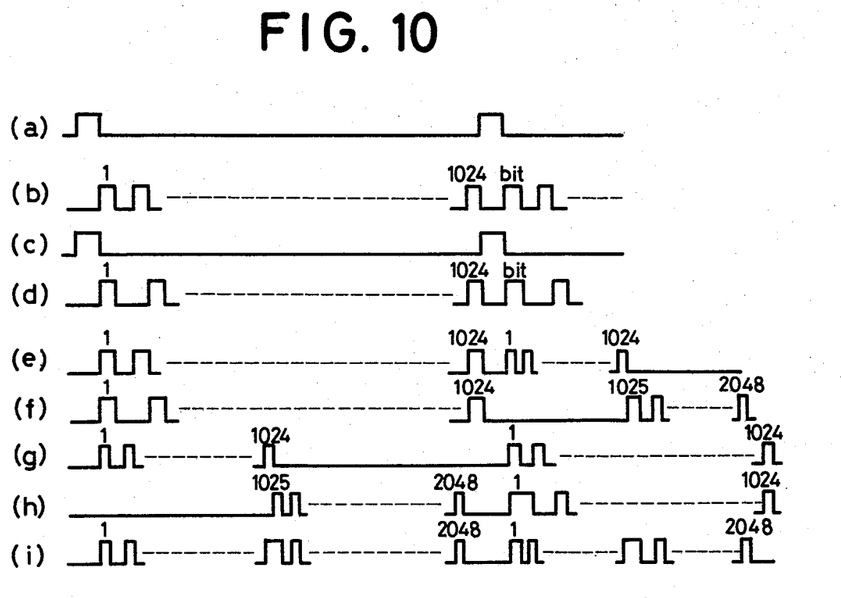
FIG. 10 is a timing chart useful for explaining the operation of the split scanning system of FIG. 9.
Figure 11A:
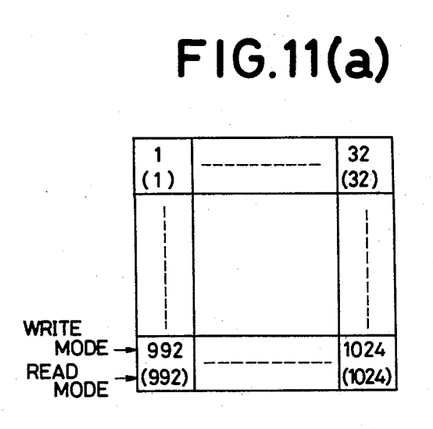
FIGS. 11(a) and 11(b) are schematic illustrations of the paired memory devices employed in the system of FIG. 9 showing how the image information is stored.
Figure 11B:
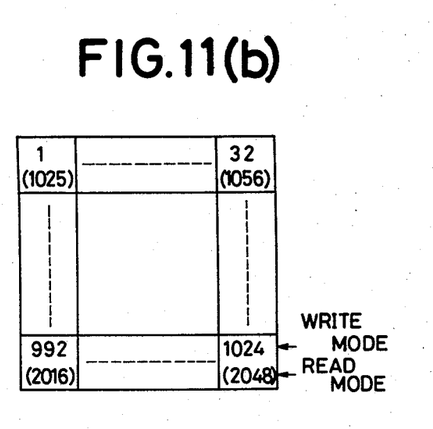

The CCDs 91 and 92 are driven to operate at the same time in response to driving pluses (FIG. 10 (a) and (c)) supplied from the driving circuit 63 so that the video signals (FIG. 10 (b) and (d)), each containing the image information of the corresponding split portion and the overlapping portion C, are supplied to the respective memory blocks MB1 and MB2 through the respective amplifiers 64 and 65 and the A/D converters 47 and 48. Each pulse of the video signal of FIG. 10(b) or (d) corresponds to a picture element in a single scanning line.

In the case where the memory block MB1 is selected to be in the write-in mode and thus the other memory block MB2 to be in the read-out mode in response to the outputs from the mode/line switching signal generating circuit 69, the outputs from the A/D converters 47 and 48 are simultaneously supplied through the input gate 70 and stored into the first and second memories 71 and 72, respectively, in parallel under the control of the address register 73 to which the externally applied write-in clock signal WCLK of lower frequency is supplied through the clock gate 74, as shown in FIG. 10(e) and (f).

Under the condition, the input gate 80 of the other memory block MB2 is closed so that the video signals from the A/D converters 47 and 48 are prevented from being supplied into the memory block MB2. At the same time, the externally applied read-out clock signal RCLK of higher frequency is supplied to the address register 83 through the clock gate 84, so that the contents stored in the third memory 81 are first read out as shown in FIG. 10(g) and then the contents stored in the fourth memory 82 are read out as shown in FIG. 10(h).

It is to be noted however that each of the first and second memories 71 and 72 or the third and fourth memories 81 and 82 stores the image information of the overlapping portion C. Thus, this fact must be taken into account when the date stored in the first and second memories 71 and 72 (or third and fourth memories 81 and 82) are read out to form a video output signal.

Figure 12:
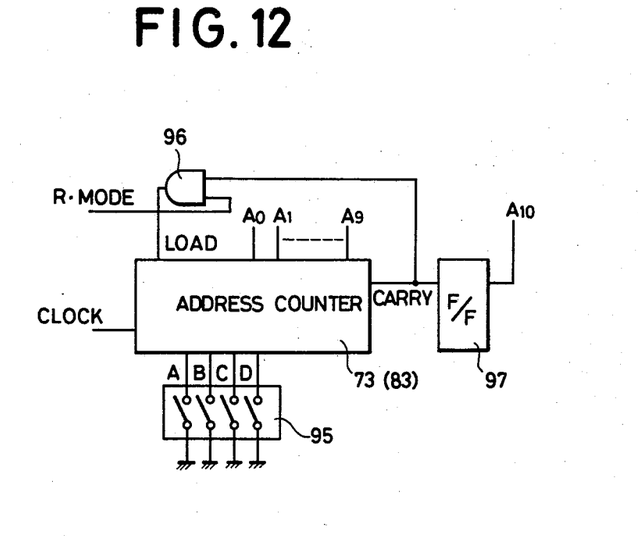
FIG. 12 is a block diagram showing one embodiment of the address counter employed in the system of FIG. 5.

Stated more in detail, when the CCD start pulses are supplied to the CCDs 91 and 92 from the driving ciucuit 63 as shown in FIG. 10(a) and (b), the CCDs 91 and 92 start to supply video signals with the same timing as shown in FIG. 10(b) and (d). Although not shown specifically, the address counter 73 (83) also starts its counting operation with the same timing, and thus all of the information supplied from the CCDs 91 and 92 are stored into the respective memories 71 and 72 (81 and 82) in the same manner. When the date stored in the memories 71 and 72 (81 and 82) is set to count up to 2,048 as different from the write-in mode in which the counter 73 (83) is set ot count up to 1,024. In this connection, one embodiment of the address counter 73 (83) is illustrated in detail in FIG. 12. As shown, a DIP switch 95 is provided as connected to the address counter 73 (83) and it supplies a code determined by the conditions of the switches "A" through "D". It is to be noted that the code supplied by the DIP switch 95 to the address counter 73 (83) may have the value in the range between "0" and "15." Also provided is an AND gate 96 having its one input connected from the CARRY terminal of the address counter 73 (83), its the other input connected to receive a write-in mode signal R-MODE and its output connected to the LOAD terminal of the address counter 73 (83).

Figure 13:
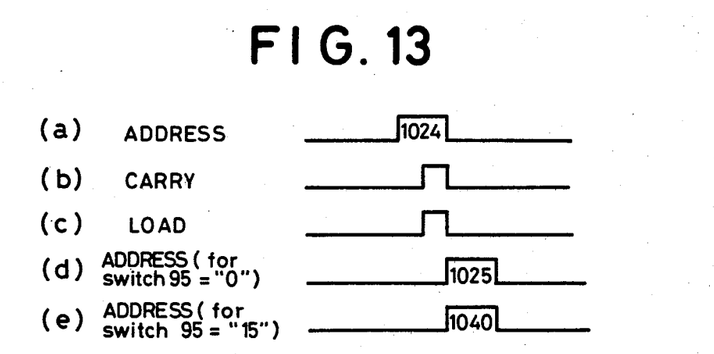
FIG. 13 is a timing chart useful for understanding the operation of the structure shown in FIG. 12.

In the read-out operation in which the date is read out of the memories 71 (81) and 72 (82) in timed sequence, when the count of the address register 73 (83) reaches 1,024, a carry signal CARRY is supplied from the CARRY terminal of the address counter 73 (83). The CARRY signal is then supplied to the AND gate 96 which, in turn, supplies a LOAD signal to the LOAD terminal of the address counter 73 (83) if the AND gate 96 also receives the read-out mode signal R-MODE. When such a LOAD signal is received, the address counter 73 (83) sets the count value in the range between "1,025" and "1,040" depending on the value of the code supplied from the DIP switch 95. This condition is illustrated in FIG. 13. That is, if the value of the code supplied from the DIP switch 95 to the address counter 73 (83) is so determined that it corresponds to the number of bits of the overlapping portion C, the image data of the overlapping portion C may be skipped when the data are read out of one of the paired memories 71 and 72 (81 and 82).

For example, if the overlapping portion C has five bits of image data, then the code supplied from the DIP switch 95 may be set to have the value of "5" thereby skipping the data stored in the address locations 1025 through 1029. In this manner, even if the image information of the overlapping portion C is commonly stored into the paired memories 71 and 72 (81 and 82), it is only read out from one of the paired memories to produce a continuous video output signal having the image information for a full single scanning line.

In carrying out the split scanning for the next scanning line by means of the CCDs 91 and 92, the memory block MB1 is set in the read-out mode and the memory block MB2 is set in the write-in mode in response to the signals supplied from the mode/line switching signal generating circuit 69. Thus, the image information read by the CCDs 91 and 92 is stored into the third and fourth memories 81 and 82 in parallel in accordance with the write-in clock signal WCLK of low frequency. At the same time, the first and second memories 71 and 72 currently storing the image information of the immediately preceding scanning line supply the stored data as their outputs one after another in timed sequence in accordance with the read-out clock signal RCLK of high frequency. As described previously, since both of the memories 71 and 72 store the image information of the overlapping portion C, the address counter 73 is so controlled to skip the address locations of either one of the memories 71 and 72 where the image information of the overlapping portion C is stored.

As described above, the memory blocks MB1 and MB2 are alternately set in the write-in and read-out modes and an original image is converted into an electrical video signal.

While the above privides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A solid-state scanning apparatus for scanning the surface of an original to convert light information into an electrical image signal comprising:
   a housing;
   holding means fixedly mounted to said housing for holding said original stationarily;
   an optical system fixedly mounted on said housing including a solid-state line sensor and focusing means disposed in alignment with said solid-state line sensor which includes a plurality of image sensing devices arranged such that an overlapping scanning section is defined between the two adjacent scanning segments in a full single scanning line scanned by said plurality of image sensing devices;
   a plurality of paired first and second storing means, each pair of which is connected to receive image data from the corresponding one of said plurality of image sensing devices;
   control means for controlling the mode of operation of said first and second storing means such that while one of said first and second storing means is set is a write-in mode, the other is set in a read-out mode, said control means also controlling the operation of said plurality of image sensing devices and said plurality of paired first and second storing means in a predetermined manner in order to prevent the image information of said overlapping sections from appearing twice in a resulting output image signal;
   a mirror system provided to reciprocate along a predetermined path for leading the light information of said original to said solid-state line sensor of said optical system; and
   driving means for driving to move said mirror system along said predetermined path in a reciprocating manner.

2. Apparatus of claim 1 wherein said each of said image sensing devices is comprised of a Charge Coupled Device (CCD) having a predetermined number of photo-electric converting elements each of which constitutes a picture element.

3. Apparatus of claim 2 wherein said plurality of CCD image sensing devices include first and second CCD image sensing devices which are arranged in a line and driven to operate staggered in time in response to first and second start pulses applied to said first and second CCD image sensing devices, respectively, from said control means with a time lag corresponding in length to said overlapping scanning section, and one of said first and second storing means of each of said paired first and second storing means is set in the write-in mode in response to said second start pulse whereby the image information read by said CCD image sensing devices is fed into the other of each of said first and second storing means in parallel.

4. Apparatus of claim 3 wherein while all of said ones of said first and second storing means are in the write-in mode, the data stored in said all of the other of said first and second storing means are read out in sequence from one after another.

5. Apparatus of claim 4 wherein the frequency of the read-out mode is twice or higher than the frequency of write-in mode.

6. Apparatus of claim 2 wherein said plurality of CCD image sensing devices include first and second CCD image sensing devices arranged in a line to define a predetermined overlapping scanning section between the two scanning sections covered by said first and second CCD image sensing devices, and said first and second CCD image sensing devices are driven to operate at the same time in response to start pulses applied from said control means to store the sensed image data to the corresponding ones of said paired first and second storing means in parallel, during which the data stored in the others of said paired first and second storing means are read out in sequence from one storing means after another thereby skipping the data of said overlapping scanning section in one of said the others.

7. Apparatus of claim 6 wherein said control means includes an address counter provided for addressing data to be stored in each pair of said first and second storing means and count skipping means connected to said address counter for skipping the count of said address counter from a first predetermined value to a second predetermined value when said address counter has reached said first predetermined value.

8. Apparatus of claim 7 wherein the difference between said first and second predetermined values corresponds in length to said overlapping scanning section.

9. Apparatus of claim 1 further comprising a guide rod which defines said predetermined path and means for carrying thereon said mirror system.

10. Apparatus of claim 9 wherein said means for carrying includes a first carriage mounted thereon a first mirror and a second carriage mounted thereon a second mirror, said first carriage moving twice as fast as said second carriage thereby the light information of said original is first reflected by said first mirror and then reflected by said second mirror to reach said solid-state line sensor.

11. Apparatus of claim 10 wherein an illumination means is mounted on said first carriage.

12. Apparatus of claim 1 further comprising control means for controlling the driving condition of said driving means.

13. Apparatus of claim 12 wherein said driving means includes a driving motor, and feed-back signals from said motor are fed to said control means to compare with a reference signal thereby insuring to move said mirror system at a constant velocity.

* * * * *